United States Patent
Ma (10) Patent No.: US 11,545,760 B1
(45) Date of Patent: Jan. 3, 2023

(54) BROADBAND METAMATERIAL REFLECTOR

(71) Applicant: Wisconsin Alumni Research Foundation, Madison, WI (US)

(72) Inventor: Chu Ma, Middleton, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 0 days.

(21) Appl. No.: 17/368,387

(22) Filed: Jul. 6, 2021

(51) Int. Cl.
*H01Q 3/44* (2006.01)
*H01Q 15/00* (2006.01)
*H01Q 21/24* (2006.01)
*G10K 11/172* (2006.01)
*G02B 1/00* (2006.01)

(52) U.S. Cl.
CPC ......... *H01Q 15/0086* (2013.01); *H01Q 21/24* (2013.01); *G02B 1/002* (2013.01); *G10K 11/172* (2013.01); *H01Q 3/44* (2013.01); *H01Q 15/00* (2013.01); *H01Q 15/0066* (2013.01)

(58) Field of Classification Search
CPC ...... H01Q 15/0086; H01Q 21/24; H01Q 3/44; H01Q 15/00; H01Q 15/0066
See application file for complete search history.

(56) References Cited

FOREIGN PATENT DOCUMENTS

CN 114709615 A * 7/2022

OTHER PUBLICATIONS

Chu Ma; "Metamaterials for Acoustic Sensing" Doctoral Thesis; Massachusetts Institute of Technology; 171 pages; Jun. 2019; US.

* cited by examiner

*Primary Examiner* — Joseph J Lauture
(74) *Attorney, Agent, or Firm* — Boyle Fredrickson, S.C.

(57) ABSTRACT

A versatile metamaterial reflector is constructed of at least one pair of first and second reflectors each having a frequency-dependent phase shifting of a reflected waveform but together providing, between them, a constant phase difference. As few as two different types of reflectors (for example, a zero and relative pi radian reflector) are used to construct a variety of metamaterial reflectors.

19 Claims, 7 Drawing Sheets

BROADBAND METAMATERIAL REFLECTOR

BACKGROUND OF THE INVENTION

The present invention relates to metamaterials, generally defined as materials that exhibit properties not found in nature, and in particular to a method and apparatus providing a readily manufactured broadband metamaterial reflector.

Metamaterial reflectors can manipulate the wave shape of a reflected waveform by altering the phase delay of the reflection in a way that differs from that which would be expected from a homogenous surface. The construction of such metamaterial reflectors can be difficult, and the resulting metamaterials may have a relatively narrow band response, meaning that they work only over a very limited range of frequencies. Both of these drawbacks can limit the use of metamaterials for important commercial applications in the control of audio and other signals.

SUMMARY OF THE INVENTION

The present invention provides a metamaterial with an extended operational bandwidth possible by relying not on the isolated phase-shifting characteristics of individual structures but instead on the difference in phase-shifting between adjacent structures. By using phase difference as the fundamental building block for the design of a metamaterial, the frequency dependency of the phase shift of the individual structures is largely canceled out allowing the desired function of the designed metamaterial to be nearly constant over a wider frequency range. This invention also lends itself to the construction of metamaterial reflectors from only two components that can be assembled together with different spatial patterns and separations to produce different metamaterial structures including lenses and retroreflectors.

More specifically, in one embodiment, the invention provides a metamaterial reflector having a first reflector surface communicating with a first acoustic cavity that receives an incident sound wave and reflects that soundwave with a first frequency-dependent phase shift; and also having second reflector surface with a second acoustic cavity receiving an incident soundwave and reflecting that soundwave with a second frequency-dependent phase shift. Importantly, the phase shifts of the first and second cavities have substantially constant and predetermined phase differences with each other over a range of frequencies of at least one-half octave.

It is thus a feature of at least one embodiment of the invention to provide a broadband metamaterial through the combination of reflector structures which, while individually being highly frequency dependent, exhibit a largely frequency-independent phase difference that can implement the desired metamaterial function.

The acoustic cavity of the first reflector surface may provide a transmission line element, and the acoustic cavity of the second reflector surface may provide a transmission line element coupled to two acoustic capacitive elements separated along the transmission line element.

It is thus a feature of at least one embodiment of the invention to use structures that can implement a well-characterized frequency-dependent phase delay.

In this regard, the first reflector may provide a first elongate closed tube opening at the reflector surface and extending along a first axis behind the reflector surface, and the second reflector may provide a second elongate closed tube opening at the reflector surface and extending along a second axis behind the reflector surface, the volume of the second elongate closed tube communicating with a first and second acoustic spring at separate points along the second axis.

It is thus a feature of at least one embodiment of the invention to provide an implementation of the transmission line and capacitive elements in structures suitable for acoustic pressure waves.

The first and second acoustic springs may be Helmholtz resonators.

It is thus a feature of at least one embodiment of the invention to implement the acoustic springs in a simple rigid structure without fabricated moving parts that is easy to manufacture.

In this regard, the first reflective surface and second reflective surface may each be comprised of first and second mirror image portions dividing the first reflective surface along a plane holding the first axis and dividing the second reflective surface along a plane holding the second axis and an axis of communication between the second elongate tube and the first and second acoustic springs; wherein the first and second mirror image portions are joined together at a seam portion.

It is thus a feature of at least one embodiment of the invention to provide a metamaterial that can be rapidly fabricated using techniques such as injection molding in simple molds.

Alternatively, the first and second acoustic springs may be weighted membranes.

It is thus a feature of at least one embodiment of the invention to provide an extremely compact structural element for metamaterial eliminating the space required of a Helmholtz resonator or the like.

The substantially constant phase difference between the structures in one embodiment may be pi radians.

It is thus a feature of at least one embodiment of the invention to provide a phase difference between the structures that can be easily adopted for a variety of metamaterial applications.

The metamaterial reflector may have multiple first reflector surfaces and second reflector surfaces assembled together in a reflective panel having only first reflector surfaces and second reflector surfaces.

It is thus a feature of at least one embodiment of the invention to provide a simple toolkit for fabrication of metamaterial surfaces requiring only two components that can be mixed and matched to provide a variety of different metamaterial functions.

In example configurations, the multiple first reflector surfaces and second reflector surfaces may be assembled together to provide a retroreflector having a bulk negative index of refraction, or to provide a diverging or converging lens.

It is thus a feature of at least one embodiment of the invention to permit a variety of different reflector types to be constructed.

The metamaterial reflector may further include a compartment sized to hold a human in a first portion flanked by upstanding sidewalls, where the retroreflector is supported by at least one upstanding sidewall to reflect sound from the first portion back toward the first portion.

It is thus a feature of at least one embodiment of the invention to provide a metamaterial suitable for sound isolation in common volumes such as automotive interiors.

The first reflective surface and second reflective surface may provide releasable connectors to assemble multiple of the first reflective surfaces and second reflective surfaces together in a tile pattern in a larger reflective surface.

It is thus a feature of at least one embodiment of the invention to provide a metamaterial for rapid prototyping or educational use that can be quickly assembled from elemental parts.

The invention may also provide a method of constructing a metamaterial reflective surface using these components by: (a) identifying a desired wave profile in a region of interest; (b) projecting the wave profile to a location of a metamaterial reflective surface; (c) quantizing the wave profile to a set of spatially separated first and second phase shifters having respective first and second frequency-dependent phase shifts with a phase difference between the first and second frequency-dependent phase shifts that is substantially constant over a range of frequencies of at least one half octave; and (d) assembling a reflective surface with first and second frequency-dependent phase shifts according to the quantized wave profile.

It is thus a feature of at least one embodiment of the invention to allow simple construction of a variety of metamaterial reflectors by defining the reflector location and the desired resulting reflection.

The method may include the step of iteratively correcting the quantized phase profile by simulation of a reflected wave from the reflective surface.

It is thus a feature of at least one embodiment of the invention to allow the use of a "binary" phase shifter assembly as discussed above to better approximate real-world wavefronts.

These particular objects and advantages may apply to only some embodiments falling within the claims and thus do not define the scope of the invention.

DETAILED DESCRIPTION OF THE PREFERRED EMBODIMENT

Figure 1:
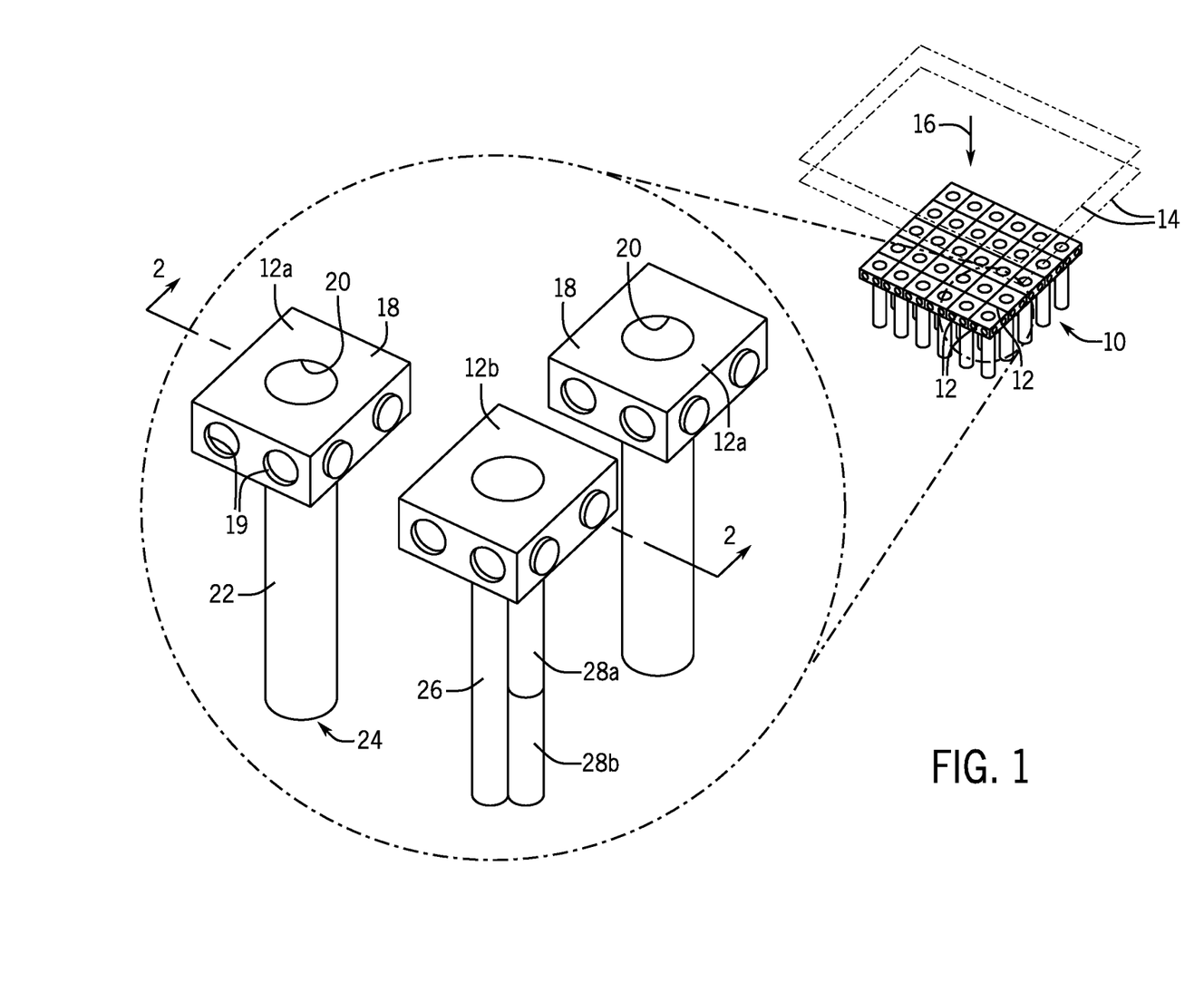
FIG. 1 is an exploded perspective view of a metamaterial reflector constructed according to the present invention from two different reflector surface elements providing relative 0 and pi radian reflective phase shifts.

Referring now to FIG. 1, a metamaterial reflective panel 10 may be assembled of multiple reflector surfaces 12 arranged to present a common, substantially continuous reflective surface such as a plane or stepwise curve. As such, the reflective panel 10 may provide for the reflection of an acoustic waveform 14 received along, but not necessarily aligned with, an axis 16 normal to reflective panel 10.

In one embodiment, the reflector surface 12 is assembled from two different components of a zero surface 12a and a pi surface 12b. Each reflector surface 12 provides an outer face 18 extending across the axis 16 and a central aperture 20 open to receive a portion of waveform 14 there through. The outer face 18 in one example may have a square periphery to allow it to tile a plane with the outer faces 18 of other reflector surfaces 12 to produce the reflective panel 10. In this regard, snap connectors 19 or similar points of releasable or permanent attachment may be placed along outwardly facing edges of the outer face 18 allowing for interconnection of the surfaces 12.

Desirably, size of the aperture 20 is maximized with respect to the area of the outer face 18 so that a significant portion of the waveform 14 impinging on the reflector surface 12 is received by and ultimately reflected out of the aperture 20, this reflection dominating the reflection from the reflector surface 12. In this regard the size of the aperture 20 may be larger than that depicted. In addition, shapes other than square for the periphery of the outer face 18 may be adopted, for example, tiling hexagons more closely approximating a circular aperture 20 to minimize the surface outside of the aperture 20. Additionally, or alternatively, noncircular apertures 20 may be used to better conform with the periphery of the outer face 18. In some embodiments, the outer face 18 may be acoustically minimized, for example, through the use of an absorptive or dispersive material attached thereto.

Extending rearwardly from the aperture 20 of the reflective zero surface 12a is a tube 22 having a closed reflective interior end 24 substantially free from the absorptive or dispersive material discussed above.

A similar tube 26 extends rearwardly from the aperture 20 of the pi surface 12b, having a closed end 24' and differing from the tube 22 slightly in length and by the inclusion of side-mounted first and second Helmholtz resonators 28a and 28b.

Figure 2:
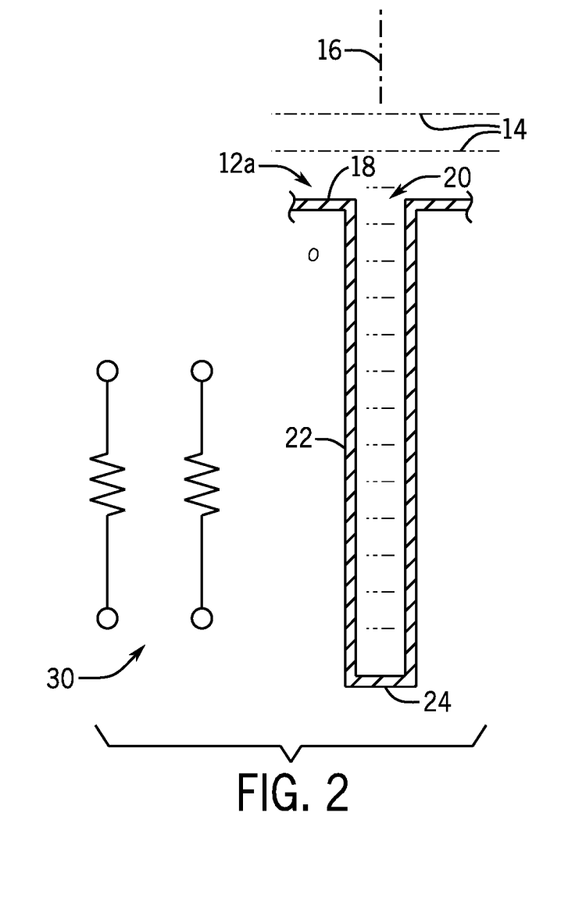
FIG. 2 is a cross-sectional view taken along line 2-2 of FIG. 1 of the zero reflective surface.
Figure 3:
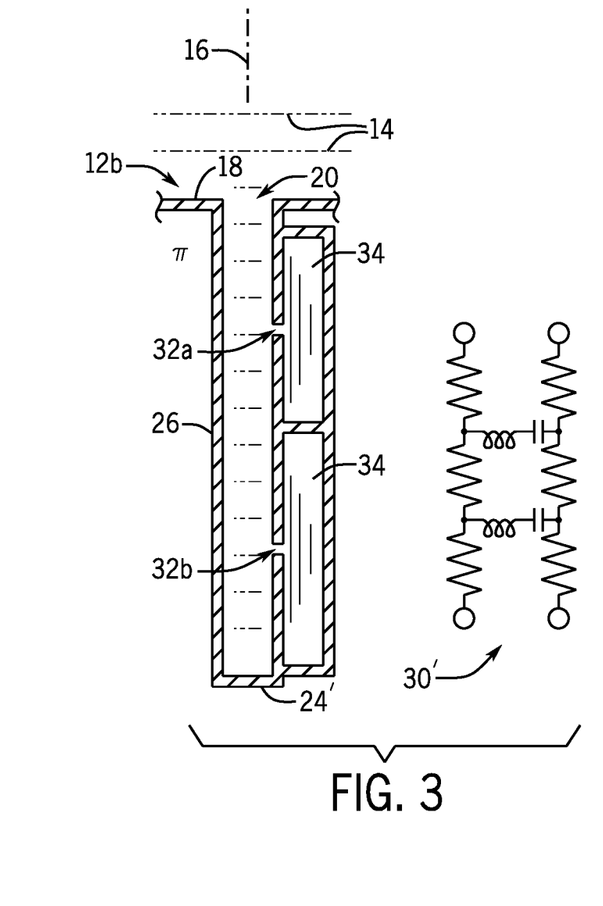
FIG. 3 is a figure similar to that of FIG. 2 showing a cross-sectional view along line 2-2 of FIG. 1 of the pi reflective surface.

Referring now to FIGS. 2 and 3, the tube 22 provides essentially an acoustic transmission line receiving the incident waveform 14 which travels along the tube 22 and is reflected from the bottom closed end 24 to then pass out of the aperture 20 as a reflection. This transmission and reflection process introduces a fixed delay proportional to twice the length of the tube 22 along the axis 16 for a given sound speed (for example, in air) which will represent a frequency-dependent phase shift with respect to the incident waveform 14. Desirably the tube 22 provides a primarily resistive impedance to produce a simplified equivalent circuit 30 of a resistive delay line, although small amounts of inductance are necessarily present and can be tolerated particularly if this inductance is similar in both of the tubes 22 and 26.

As shown in FIG. 3, the tube 26 also provides a generally resistive transmission line for acoustic signals of the waveform 14 which are received within the tube 26 and reflect off the closed end 24 of that tube 26. Tube 26 also includes open "necks" or channels 32a and 32b passing laterally through a side wall and spaced from each other along the axis 16. These channels 32a and 32b lead to closed chambers 34a and 34b, respectively, which together with the channels 32 provide Helmholtz resonators. As will be understood, the closed chambers 34 of the Helmholtz resonators provide acoustic springs or capacitive elements while the mass of air moving in the channels 32 act like an acoustic inductance through its inertia to produce the equivalent circuit 30'.

The effect of the inductive and capacitive elements of the chambers 34 are to provide a 180 degree or pi radian phase shift of the signal reflected out of the tube 26 relative to the phase of the waveform reflected out of tube 22. As noted above, the length of the tube 26 needed to achieve this phase difference may be slightly shorter than the length of the tube 22 to correct for the effective loading of the inductive and capacitive elements.

Figure 4:
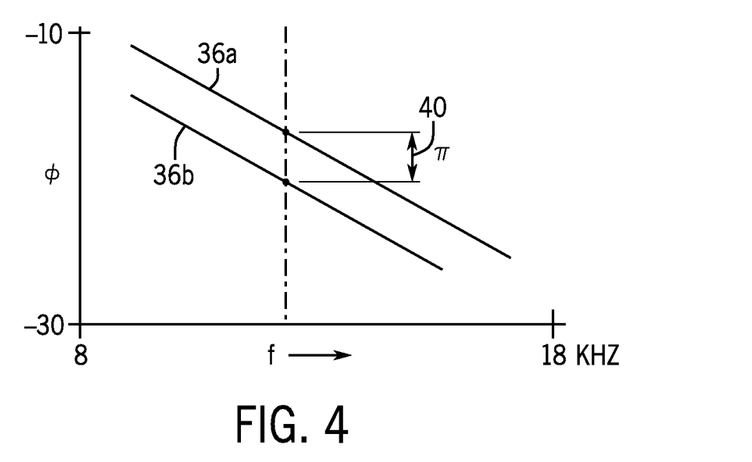
FIG. 4 is a plot of the phase shift of the elements of FIGS. 2 and 3 as a function of frequency showing a substantially constant phase shift therebetween.
Figure 5:
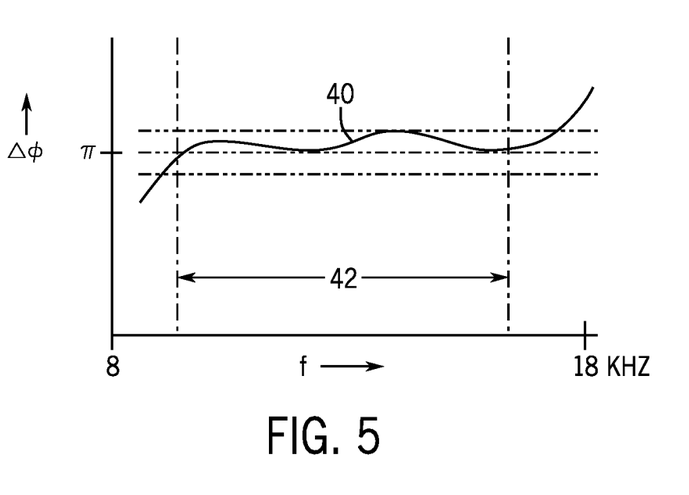
FIG. 5 is a plot similar to that of FIG. 4 showing a phase difference as a function of frequency such as remains substantially constant.

Referring now to FIG. 4, graphically, the phase shift 36a produced by the reflector surface 12a will be a function of frequency, exhibiting increasing phase lag for higher frequencies. Likewise, the phase shift 36b produced by the reflector surface 12b will be a function of frequency, also exhibiting increasing phase lag for higher frequencies but at a phase offset from phase shift 36a so that a phase difference 40 between the phase shift 36a and the phase shift 36b for any given frequency is substantially constant as shown in FIG. 5. In one embodiment, the phase difference 40 will remain substantially constant at a value of pi radians over an octave 42 of frequency and no less than half an octave of frequency, for example, remaining within a range of plus or minus 10% or plus or minus 15%.

In one embodiment a pi radians phase difference 40 can be achieved with the following dimensions for an air resonator at standard temperature and pressure:

TABLE I

| length of tube 22 | 50 mm |
| length of tube 26 | 46.5 mm |
| diameter of tubes 22 and 26 | 5 mm |
| diameter of channels 32a and 32b | 1 mm |
| length of channels 32a and 32b along the path of air flow through the openings | 1 mm |
| diameter of the Helmholtz chambers 34 | 4 mm |
| height of the Helmholtz chambers along axis 16 | 20 mm |

It will be appreciated that precise dimensions for a variety of different constructions and materials can be obtained by modeling or experimentation guided by the knowledge of the equivalent circuits 30.

Figure 6:
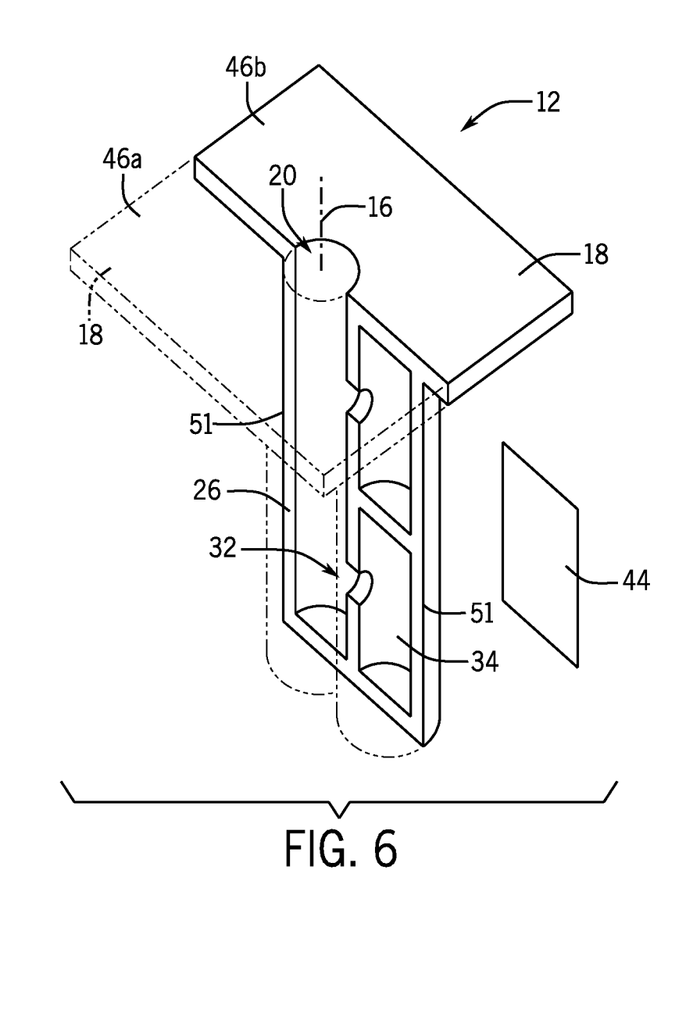
FIG. 6 is a perspective view of one half of a reflector surface constructed according to FIG. 3 such as may be readily implemented with injection molding or the like as two mirror reflection components.

Referring now to FIG. 6, while the structure of the reflector surfaces may be readily fabricated using 3D printing (additive manufacturing), it will be appreciated that the reflector surfaces 12a and reflector surface 12b may also be readily fabricated, for example, using standard injection molding by dividing the reflector surface 12a or 12b along a vertical plane 44 aligned with axis 16 and bisecting the tubes 22, 26 and chambers 34 to permit proper draft angles for mold release into mirror image parts 46a and 46b. These parts 46 may be joined by interfacial seam 51, for example, of welded material, adhesive, snap fittings, or the like or as assembled using an external clamping structure.

Figure 7:
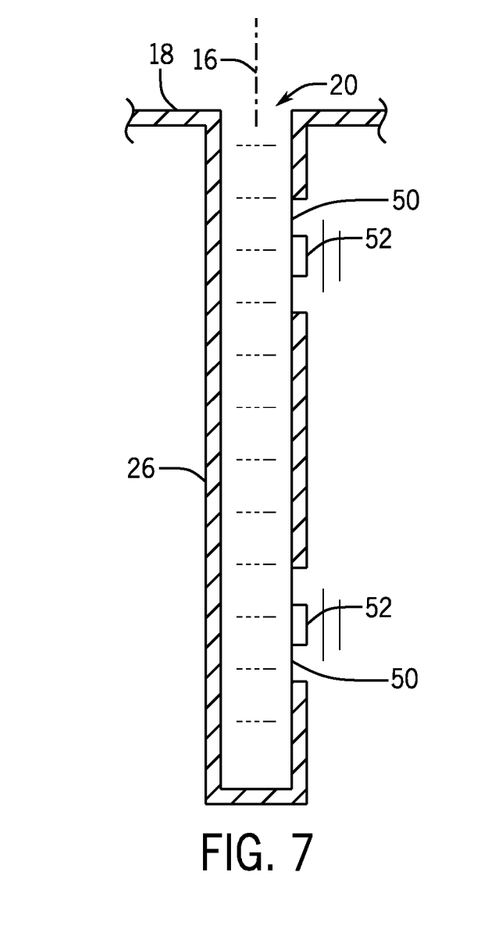
FIG. 7 is a figure similar to that of FIG. 3 showing an alternative embodiment of the reflector surface of FIG. 3 employing a mass spring capacitive element.

Referring now to FIG. 7, it will be appreciated that the capacitive effect of the Helmholtz chambers 34 of FIG. 3 may also be implemented using a spring mass system, for example, by providing flexible elastic membranes 50 positioned at the locations of the channels 32a and 32b previously described. The elastic membranes provide an equivalent spring constant to the air contained in the Helmholtz chamber and may have intrinsic or discrete attached weights 52 producing a mass-spring system where the mass provides the inductive element of the channels 32 and the elasticity of the membranes 50 provides the compressive elasticity of gas trapped in the chambers 34.

Figure 8:
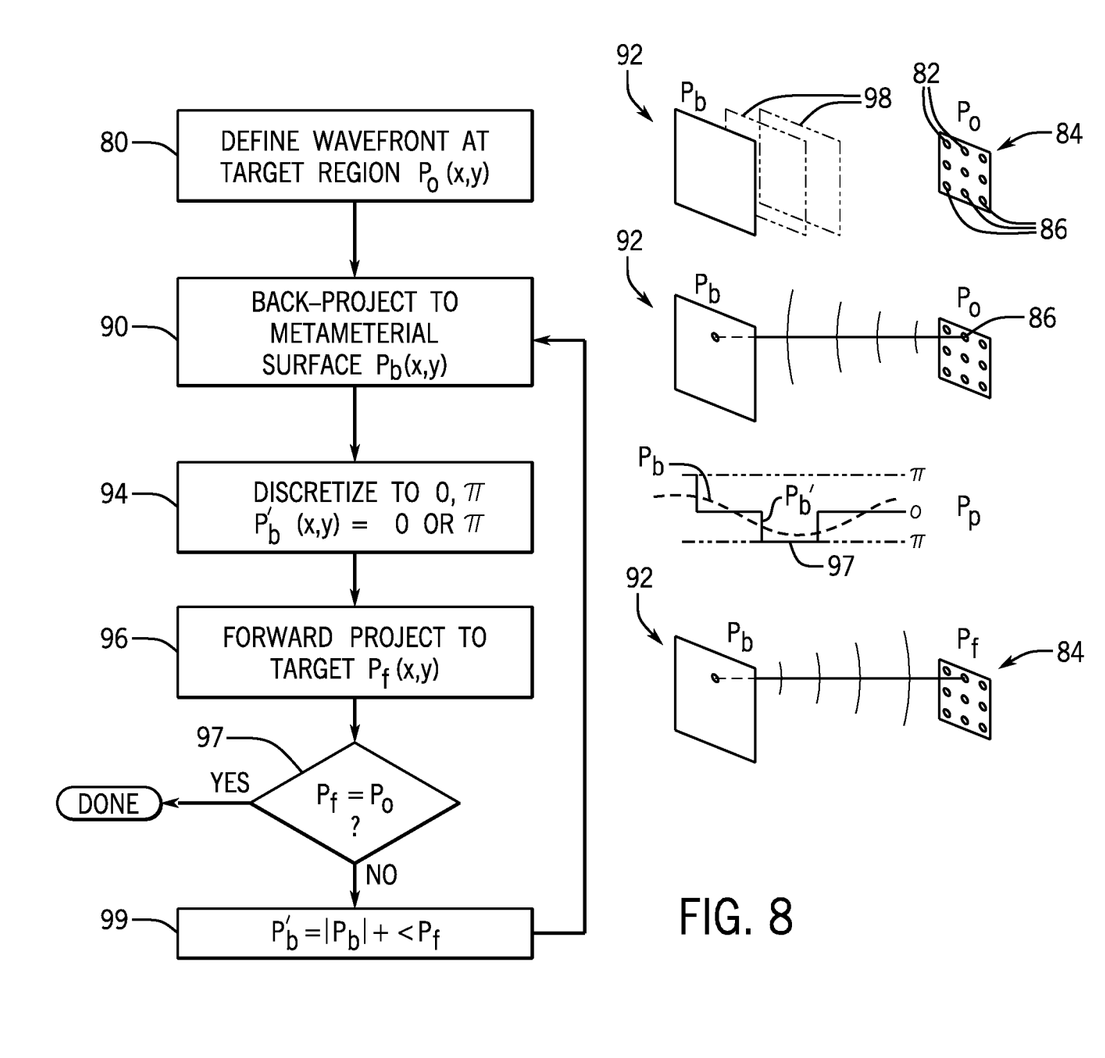
FIG. 8 is a flowchart and accompanying diagrams showing the steps of designing a material using the reflective surfaces of FIGS. 1-7.

Referring now to FIG. 8, the present invention contemplates that a variety of different metamaterial reflector surfaces can be constructed with only two types of reflector surfaces 12 (e.g., zero surfaces 12a and pi surfaces 12b) greatly simplifying the fabrication of reflective panels 10. Different characteristics of the reflective panels 10 are created by controlling the spatial location of these different reflector surfaces 12a and 12b.

Still referring to FIG. 8, the process of determining the appropriate spatial location of the reflective surfaces 12a and 12b may be performed on an electronic computer 70 having a processor 72 executing a program 74 stored in computer memory 78. As indicated by process block 80, this program may begin by accepting a definition of a desired acoustic wavefront 82 within a located region of interest 84. This definition, for example, may describe a set of wave amplitudes and phases at different points 86 within that region of interest providing a wavefront 82 expressed as $p_0(x, y)$.

At process block 90 this defined wavefront 82 may be propagated using the Huygens principle to a reflector location 92 of a desired metamaterial reflector to be constructed under appropriate assumptions for transmissive media (e.g., dry air at standard temperature and pressure). The result is a wavefront $p_b(x, y)$ incident at the reflector location 92.

At process block 94 the propagated wavefront 82' at the reflector location 92 is then subtracted from an expected incident waveform 98 (for example, a plane wave as shown with respect to process block 80) and the difference between these two waves discretized into a piecewise set of desired phase shifts 97 of zero or pi radians relative offset at the reflector location 92 with a rollover of phase every $2\pi$ radians to produce discretized wavefront $p'_b(x, y)$. The location of each of these discretized steps defines the position of a corresponding reflector surface 12a or 12b along the reflector location 92.

At process block 96, the discretized wavefront $p'_b(x, y)$ is forward-projected to the region of interest 84 to define a forward-projected wavefront $p_f(x, y)$.

At decision block 97, if $p_f(x, y) = p_0(x, y)$ over each point x, y, the process ends and the points on the reflector location 92 corresponding with zero phase shift in the discretized wavefront $p'_b(x, y)$ are assigned a reflector surface 12a and the points on the reflector location 90 corresponding to pi phase shift are assigned to a reflector surface 12b to construct the desired metamaterial reflective panel 10.

If the equality of decision block 97 is not satisfied to within a predetermined tolerance, the program 74 proceeds to process block 99 and the desired wavefront 82 is modified to produce a wavefront $p'_b(x, y)$ having the amplitude of the original wavefront 82 $p_b(x, y)$ and the waveform phases of the forward-projected wavefront $p_f(x, y)$ as follows:

$$p'_b(x,y) = |p_b(x,y)| e^{\angle p_f(x,y)}$$

This wavefront of $p'_b(x, y)$ then replaces $p_b(x, y)$ during a set of iterations through process blocks 90, 94, 96 and 97 until decision block 97 is satisfied to within a predetermined tolerance.

In an alternative embodiment, a simulation of the receipt of the incident waveform 98 and its reflection to the region of interest 84 may then be conducted to compute an error between the reflected waveform and the desired wavefront 82 to iteratively optimize the locations of the reflector surfaces 12, such optimization accommodating the difference between a piecewise discontinuous waveform of different phase differences and a physically realizable acoustic wave. This iteration process may also use a variety of different mathematical techniques such as stimulated annealing or Monte Carlo techniques or the like to provide a final set of location values for the reflector surfaces 12*a* and 12*b*.

Figure 9:
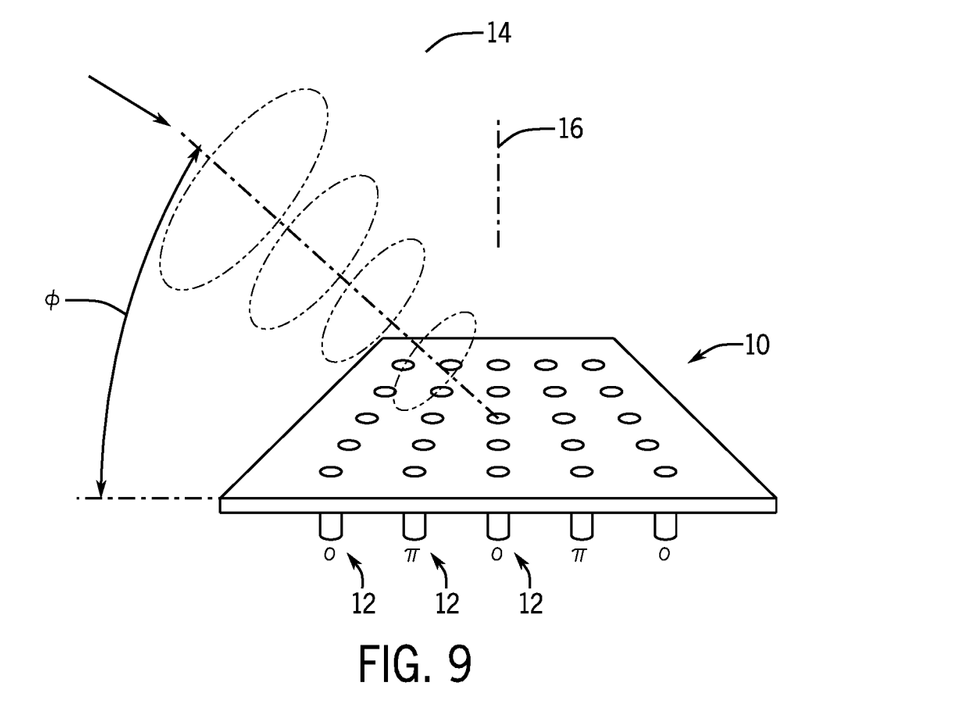
FIG. 9 is a diagrammatic representation of a reflective surface providing a retroreflector.

Referring now to FIG. 9, a simple retroreflector may be constructed by alternating reflector surfaces 12*a* and 12*b* only along adjacent rows extending perpendicular to a plane of the reflection. With the retroreflector, an incident wave 14 may be reflected at a same reflection angle ϕ as its angle of incidence.

Figure 10:
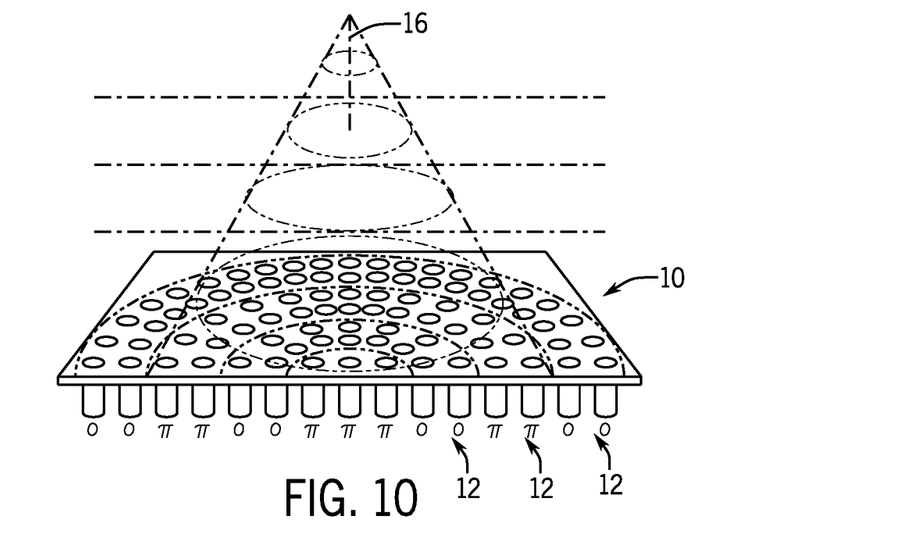
FIG. 10 is a figure similar to FIG. 9 showing a reflective surface producing a converging or diverging lens.

Referring to FIG. 10, a diverging or focusing lens may be constructed by arranging sets of surfaces 12*a* and 12*b* (or vice versa) in sets of concentric rings about an axis 16 in the manner of a zone plate Fresnel lens. In a cylindrical lens example, 35 rows of apertures 20 of the reflecting surfaces 12*a* and 12*b* may be arranged with a spacing of 480 mm to focus a 10 kHz waveform using a pattern [0, 0, π, π, π, 0, 0, 0, 0, 0, π, π, π, π, π, π, π, π, 0, π, π, π, π, π, π, π, 0, 0, 0, 0, 0, π, π, π, 0, 0].

Figure 11:
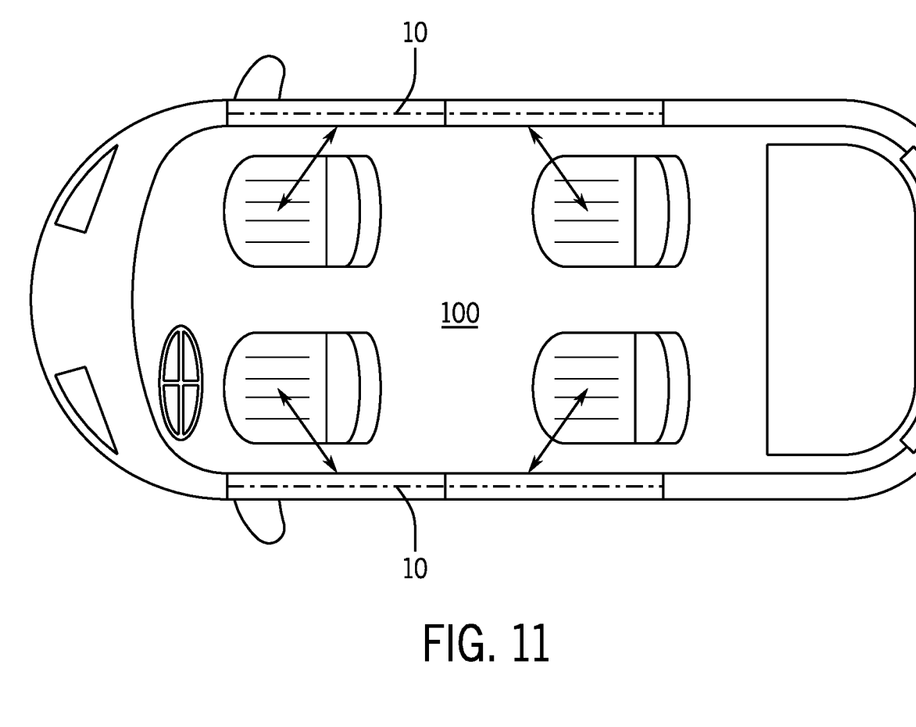
FIG. 11 is a phantom top plan view of an automobile incorporating retroreflective panels for sound isolation.

Referring now to FIG. 11, in one application of the present invention, a retroreflective panel, for example, per FIG. 9 may find use in sound isolation within enclosed spaces such as a vehicle interior 100 where such reflective panels 10 may be installed, for example, in the sidewalls or doors of the vehicle. In such installation, the rows of each type of reflective surface 12*a* and 12*b* may extend vertically. In this way, for example, sound from an entertainment device or speaking by a passenger and driver in a front section of the vehicle will not reflect off the reflective panels 10 toward the rear seats of the vehicle but will instead retroreflect back to the sound source (for example, the passenger and driver) providing a degree of acoustic privacy. A similar effect operates for passengers in the rear seat using the same panels 10. Sound blocking partitions or cubicles for workspaces with similar construction are envisioned.

Note that although the Helmholtz resonators are shown for simplicity mounted to a single side of the transmission line tube, it is contemplated that they may be distributed around the transmission line tube 26 to minimize the area of the outer face 18 with respect to the aperture. As used herein, the term acoustic means the mechanical vibration of a fluid media and is not limited to the audible spectrum.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What I claim is:

1. A metamaterial reflector comprising:
    at least one first reflector surface communicating with an acoustic cavity for receiving an incident sound wave and reflecting that soundwave with a first frequency-dependent phase shift; and
    at least one second reflector surface communicating with an acoustic cavity for receiving an incident soundwave and reflecting that soundwave with a second frequency-dependent phase shift having a substantially constant predetermined phase difference from the first frequency-dependent phase shift over a range of frequencies of at least one half octave.

2. The metamaterial reflector of claim 1 wherein the acoustic cavity of the first reflector surface provides a transmission line element and wherein the acoustic cavity of the second reflector surface provides a transmission line element coupled to two acoustic capacitive and inductive elements separated along the transmission line element.

3. The metamaterial reflector of claim 1 wherein the first reflector provides a first elongate closed tube opening at the reflector surface and extending along a first axis behind the reflector surface; and
    the second reflector provides a second elongate closed tube opening at the reflector surface and extending along a second axis behind the reflector surface, a volume of the second elongate closed tube communicating with a first and second acoustic spring at separate points along the second axis.

4. The metamaterial reflector of claim 3 wherein the first and second acoustic springs are weighted membranes.

5. The metamaterial reflector of claim 1 wherein the first and second acoustic springs are Helmholtz resonators.

6. The metamaterial reflector of claim 1 wherein the first reflective surface and second reflective surface are each comprised of first and second mirror image portions dividing the first reflective surface along a plane holding the first axis and dividing the second reflective surface along a plane holding the second axis and an axis of communication between the second elongate tube and the first and second acoustic springs; wherein the first and second mirror image portions are joined together at a seam portion.

7. The metamaterial reflector of claim 1 wherein the range of frequencies is at least one octave.

8. The metamaterial reflector of claim 1 wherein substantially a constant phase difference provides a phase difference over the range of frequencies of plus or minus 15%.

9. The metamaterial reflector of claim 1 wherein a substantially constant phase difference provides a phase difference over the range of frequencies of plus or minus 10%.

10. The metamaterial reflector of claim 1 wherein the substantially constant phase difference is pi radians.

11. The metamaterial reflector of claim 1 providing multiple first reflector surfaces and second reflector surfaces assembled together in a reflective panel having only first reflector surfaces and second reflector surfaces.

12. The metamaterial reflector of claim 11 wherein the multiple first reflector surfaces and second reflector surfaces are assembled together to provide a retroreflector having a bulk negative index of refraction.

13. The metamaterial reflector of claim 12 wherein including a compartment sized to hold a human in a first portion flanked by upstanding sidewalls, wherein the retroreflector is supported by at least one upstanding sidewall to reflect sound from the first portion back toward the first portion.

14. The metamaterial reflector of claim 11 wherein the reflective panel is flat and the multiple first reflector surfaces and second reflector surfaces are assembled together to one of a converging mirror or diverging mirror.

15. The metamaterial reflector of claim 1 wherein the range of frequencies includes an audio frequency of at least 1.3 kHz.

16. The metamaterial reflector of claim 1 wherein in the first reflective surface and second reflective surface provide releasable connectors to assemble multiple of the first reflective surfaces and second reflective surfaces together in a tile patterns in a larger reflective surface.

17. The metamaterial reflector of claim 1 wherein the first reflective surface and second reflective surface are a polymer material.

18. A method of constructing a metamaterial reflective surface comprising the steps of:
   identifying a desired wave profile in a region of interest;
   projecting the wave profile to a location of a metamaterial reflective surface;
   quantizing the wave profile to a set of spatially separated first and second phase shifters having respective first and second frequency-dependent phase shift with a phase difference between the first and second frequency-dependent phase shift that is substantially constant over a range of frequencies of at least one half octave; and
   assembling a reflective surface with first and second frequency-dependent phase shifts according to the quantized wave profile.

19. The method of claim 18 further including the step of iteratively correcting the quantized phase profile by simulation of a reflected wave from the reflective surface.

* * * * *